United States Patent
Abbasi et al.

(10) Patent No.: US 9,297,566 B2
(45) Date of Patent: Mar. 29, 2016

(54) ENTHALPY BASED CONTROL FOR A REFRIGERATION APPLIANCE

(71) Applicant: General Electric Company, Schenectady, NY (US)

(72) Inventors: Bahman Abbasi, Louisville, KY (US); Keith Wesley Wait, Louisville, KY (US)

(73) Assignee: General Electric Company, Schenectady, NY (US)

( * ) Notice: Subject to any disclaimer, the term of this patent is extended or adjusted under 35 U.S.C. 154(b) by 459 days.

(21) Appl. No.: 13/772,672

(22) Filed: Feb. 21, 2013

(65) Prior Publication Data

US 2014/0230464 A1    Aug. 21, 2014

(51) Int. Cl.
F25D 17/06 (2006.01)
F25B 49/02 (2006.01)
F25D 29/00 (2006.01)

(52) U.S. Cl.
CPC ............. *F25B 49/022* (2013.01); *F25D 29/00* (2013.01); *F25B 2500/19* (2013.01); *F25B 2600/0253* (2013.01); *F25B 2600/112* (2013.01); *F25D 2700/12* (2013.01)

(58) Field of Classification Search
CPC .............. F25B 49/022; F25B 2500/19; F25B 2600/112; F25B 2600/0253; F25D 2700/12; F25D 29/00
See application file for complete search history.

(56) References Cited

U.S. PATENT DOCUMENTS

| 3,686,893 | A | * | 8/1972 | Edwards | 62/402 |
| 5,675,979 | A | * | 10/1997 | Shah | 62/176.6 |
| 5,711,159 | A | * | 1/1998 | Whipple, III | 62/82 |
| 6,725,680 | B1 | | 4/2004 | Schenk et al. | |

FOREIGN PATENT DOCUMENTS

| EP | 2 386 812 A2 | | 11/2011 |
| JP | H0363441 A | * | 3/1991 |
| JP | 2005140472 A | * | 6/2005 |

OTHER PUBLICATIONS

Atsushi, Remote Controller, Jun. 2, 2005, JP2005140472A, Whole Document.*
Kichiji, Temperature Control Method for Air Conditioner, Mar. 19, 1991, JPH0363441A, Whole Document.*
ME 4053 Mechanical Systems Laboratory, Controller Parameter Formulas, Whole Document.*

* cited by examiner

*Primary Examiner* — M. Alexandra Elve
*Assistant Examiner* — Larry Furdge
(74) *Attorney, Agent, or Firm* — Dority & Manning, P.A.

(57) ABSTRACT

A control system for a refrigeration appliance is provided. The control system uses a linear model that is designed to minimize or remove excess enthalpy from one or more compartments and/or features of the appliance. At least one variable speed compressor is operated at a speed that will remove excess enthalpy within a desired time period while also operating at an optimized speed for energy efficiency.

20 Claims, 3 Drawing Sheets

US 9,297,566 B2

ENTHALPY BASED CONTROL FOR A REFRIGERATION APPLIANCE

FIELD OF THE INVENTION

The subject matter of the present disclosure relates generally to a control system for a refrigeration appliance.

BACKGROUND OF THE INVENTION

A commonly available design for a refrigeration appliance, particularly one for consumer use, includes a cabinet that contains a freezer compartment and a fresh food compartment. These compartments may be arranged e.g., side by side or may include one positioned over the other. In one example of a conventional design, the evaporator portion of a refrigeration loop is positioned in the freezer compartment where a fan moves air in the freezer compartment across the evaporator to freeze the contents of the freezer compartment. A damper positioned between the freezer compartment and the fresh food compartment is used to feed a portion of the air over to the fresh food compartment for cooling its contents.

To control the refrigeration loop that provides cooling for the refrigerator, one previous approach has been the use of a single thermostat such as e.g., a bimetallic thermostat. The compressor operates at a single speed and is cycled on or off based on the set point temperature of the thermostat and the air temperature in the refrigerator compartments.

While control based on the difference between the measured temperature and a temperature set point can be used to effectively control temperature, such methodology provides no direct way to minimize energy consumption of the appliance. For example, in a system based on thermostatic control of a compressor that can only operate at a single speed, cycling the compressor between on and off states may provide more cooling than is needed to reach the desired temperature set point. An overshoot can occur where the single speed compressor removes more heat than is necessary to reach the temperature set point, which results in inefficient energy usage.

A more modern approach to control includes the use of refrigerators having one or more controllers that execute a wide variety of algorithms for temperature control of the appliance. However, many of these controllers are based on complex, non-linear models of the heat transfer behavior of the appliance. Such non-linear controllers typically require a significant amount of tuning based on experimentation that must be performed for each different configuration or model of refrigeration appliance provided.

Therefore, a control system for a refrigerator appliance would be useful. More particularly, a control system for a refrigerator appliance that can determine the speed at which to operate the compressor so as to cool one or more components (including compartments and/or other features) to one or more desired temperature settings while also minimizing the amount of energy usage by the compressor would be useful. Such a control system that is based on a linear model that can be tuned analytically so as to reduce design time would also be useful.

BRIEF DESCRIPTION OF THE INVENTION

The present invention provides a control system for a refrigeration appliance. The control system uses a linear model that is designed to minimize or remove excess enthalpy from one or more compartments and/or features of the appliance. At least one variable speed compressor is operated at a speed that will remove excess enthalpy within a desired time period while also operating at an optimized speed for energy efficiency. Additional aspects and advantages of the invention will be set forth in part in the following description, or may be apparent from the description, or may be learned through practice of the invention.

In one exemplary embodiment, the present invention provides a method of operating a refrigerator appliance having a variable speed compressor. The steps of the method include receiving a set point temperature $T_{i-SP}$ for a component of the appliance; measuring the temperature $T_i$ of the component; calculating an excess enthalpy $H_i$ of the component from the steps of receiving and measuring; determining an instantaneous cooling capacity required Cap to reduce the excess enthalpy $H_i$ substantially to zero within a selected time period $t_s$; and calculating a compressor speed that delivers at least the instantaneous cooling capacity required Cap while minimizing power consumption of the compressor.

In other exemplary aspects, the step of receiving can further include receiving the set point temperatures $T_{i-SP}$ for multiple components of the appliance. The step of measuring can further include measuring the temperatures $T_i$ for multiple components of the appliance. The step of calculating an excess enthalpy $H_i$ can further include calculating the excess enthalpy $H_i$ for each of the multiple components of the appliance. This exemplary method can also include calculating the total excess enthalpy H of the appliance from the excess enthalpy $H_i$ determined for the multiple components of the appliance.

In another exemplary embodiment, the present invention provides a refrigerator appliance that includes at least one component that is configured for cooling during operation of the appliance, and a refrigeration loop configured for providing cooling to the component during operation of the appliance. The refrigeration loop comprises an evaporator; a condenser; a variable speed compressor; an expansion device; and at least one temperature sensor configured for providing temperature measurement of the component. One or more controllers are configured for receiving at least one temperature measurement from the temperature sensor; calculating an excess enthalpy of the component using the at least one temperature measurement and a temperature set point; determining an instantaneous cooling capacity required Cap to reduce the excess enthalpy substantially to a predetermined minimum value $H_{PMV}$ within a predetermined time period $t_s$; ascertaining a compressor speed $S_c$ that delivers at least the instantaneous cooling capacity required Cap while reducing the power consumption of the compressor; and operating the variable speed compressor substantially at compressor speed $S_c$. Multiple components may be cooled by the refrigerator loop and monitored by the controller as well.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
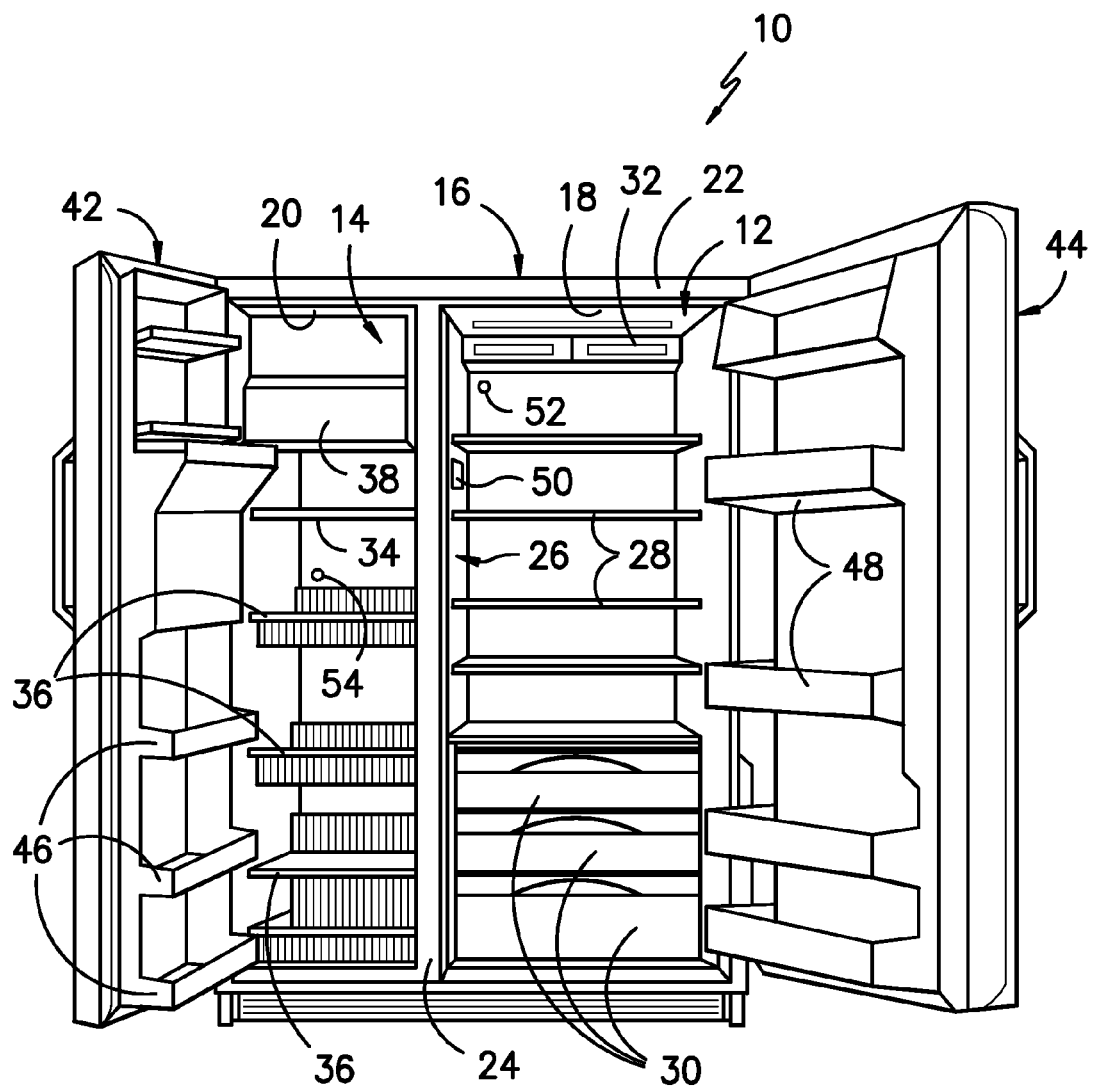
FIG. 1 provides an exemplary embodiment of a refrigerator appliance as may be used with the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front view of a representative refrigerator 10 in an exemplary embodiment of the present invention. More specifically, for illustrative purposes, the present invention is described with a refrigerator 10 having a construction as shown and described further below. As used herein, a refrigerator includes appliances such as a refrigerator/freezer combination, side-by-side, bottom mount, compact, and any other style or model of a refrigerator. Accordingly, other configurations including multiple and different styled compartments could be used with refrigerator 10, it being understood that the configuration shown in FIG. 1 is by way of example only.

Refrigerator 10 includes a fresh food storage compartment 12 and a freezer storage compartment 14. Freezer compartment 14 and fresh food compartment 12 are arranged side-by-side within an outer case 16 and defined by inner liners 18 and 20 therein. A space between case 16 and liners 18 and 20, and between liners 18 and 20, is filled with foamed-in-place insulation. Outer case 16 normally is formed by folding a sheet of a suitable material, such as pre-painted steel, into an inverted U-shape to form the top and side walls of case 16. A bottom wall of case 16 normally is formed separately and attached to the case side walls and to a bottom frame that provides support for refrigerator 10. Inner liners 18 and 20 are molded from a suitable plastic material to form freezer compartment 14 and fresh food compartment 12, respectively. Alternatively, liners 18, 20 may be formed by bending and welding a sheet of a suitable metal, such as steel.

A breaker strip 22 extends between a case front flange and outer front edges of liners 18, 20. Breaker strip 22 is formed from a suitable resilient material, such as an extruded acrylo-butadiene-styrene based material (commonly referred to as ABS). The insulation in the space between liners 18, 20 is covered by another strip of suitable resilient material, which also commonly is referred to as a mullion 24. In one embodiment, mullion 24 is formed of an extruded ABS material. Breaker strip 22 and mullion 24 form a front face, and extend completely around inner peripheral edges of case 16 and vertically between liners 18, 20. Mullion 24, insulation between compartments, and a spaced wall of liners separating compartments, sometimes are collectively referred to herein as a center mullion wall 26. In addition, refrigerator 10 includes shelves 28 and slide-out storage drawers 30, sometimes referred to as storage pans, which normally are provided in fresh food compartment 12 to support items being stored therein.

Mullion 24 or mullion wall 26 includes a damper 50 that is opened and closed to allow cooler air from the freezer compartment 14 into fresh food compartment 12. In one exemplary embodiment of the present invention, damper 50 can be a variable damper 50 meaning that its position can be dynamically adjusted between open and closed as well as all settings in between. For example, damper 50 can be set at 25 percent open, 36 percent open, 64 percent, open, and substantially all other values from 0 percent open to 100 percent open. The position of damper 50 can be determined by a sensor and/or e.g., the voltage or current provided to an actuator that operates variable damper 50. The position of the variable damper 50 can be determined by, and communicated to, variable damper 50 by a controller as will now be further described. Other control configurations may be used as well. A non-variable damper may also be used in exemplary embodiments of the present invention as well.

Refrigerator 10 can be operated by one or more controllers (not shown) or other processing devices according to programming and/or user preference via manipulation of a control interface 32 mounted e.g., in an upper region of fresh food storage compartment 12 and connected with the controller. The controller may include one or more memory devices and one or more microprocessors, such as a general or special purpose microprocessor operable to execute programming instructions or micro-control code associated with the operation of the refrigerator. The memory may represent random access memory such as DRAM, or read only memory such as ROM or FLASH. In one embodiment, the processor executes programming instructions stored in memory. The memory may be a separate component from the processor or may be included onboard within the processor. The controller may include one or more proportional-integral (PI) controllers programmed, equipped, or configured to operate the refrigerator appliance according to exemplary aspects of the control methods set forth herein. Accordingly, as used herein, "controller" includes the singular and plural forms.

The controller may be positioned in a variety of locations throughout refrigerator 10. In the illustrated embodiment, the controller may be located e.g., behind an interface panel 32 or doors 42 or 44. Input/output ("I/O") signals may be routed between the control system and various operational components of refrigerator 10 along wiring harnesses that may be routed through e.g., the back, sides, or mullion 26. Typically, through user interface panel 32, a user may select various operational features and modes and monitor the operation of refrigerator 10. In one embodiment, the user interface panel may represent a general purpose I/O ("GPIO") device or functional block. In one embodiment, the user interface panel 32 may include input components, such as one or more of a variety of electrical, mechanical or electro-mechanical input devices including rotary dials, push buttons, and touch pads. The user interface panel 32 may include a display component, such as a digital or analog display device designed to provide operational feedback to a user. The user interface panel may be in communication with the controller via one or more signal lines or shared communication busses.

In one exemplary embodiment of the present invention, one or more temperature sensors are provided to measure the temperature FF THERM in the fresh food compartment 12 and the temperature FZ THERM in the freezer compartment 14. This temperature information can be provided, e.g., to the controller for use in operating refrigerator 10 as will be more fully discussed below. These temperature measurements may be taken intermittently or continuously during operation of the appliance and/or execution of a control system as further described below.

A shelf 34 and wire baskets 36 are also provided in freezer compartment 14. In addition, an ice maker 38 may be provided in freezer compartment 14. A freezer door 42 and a fresh food door 44 close access openings to freezer and fresh food compartments 14, 12, respectively. Each door 42, 44 is mounted to rotate about its outer vertical edge between an open position, as shown in FIG. 1, and a closed position (not shown) closing the associated storage compartment. Freezer door 42 includes a plurality of storage shelves 46, and fresh food door 44 includes a plurality of storage shelves 48.

Figure 2:
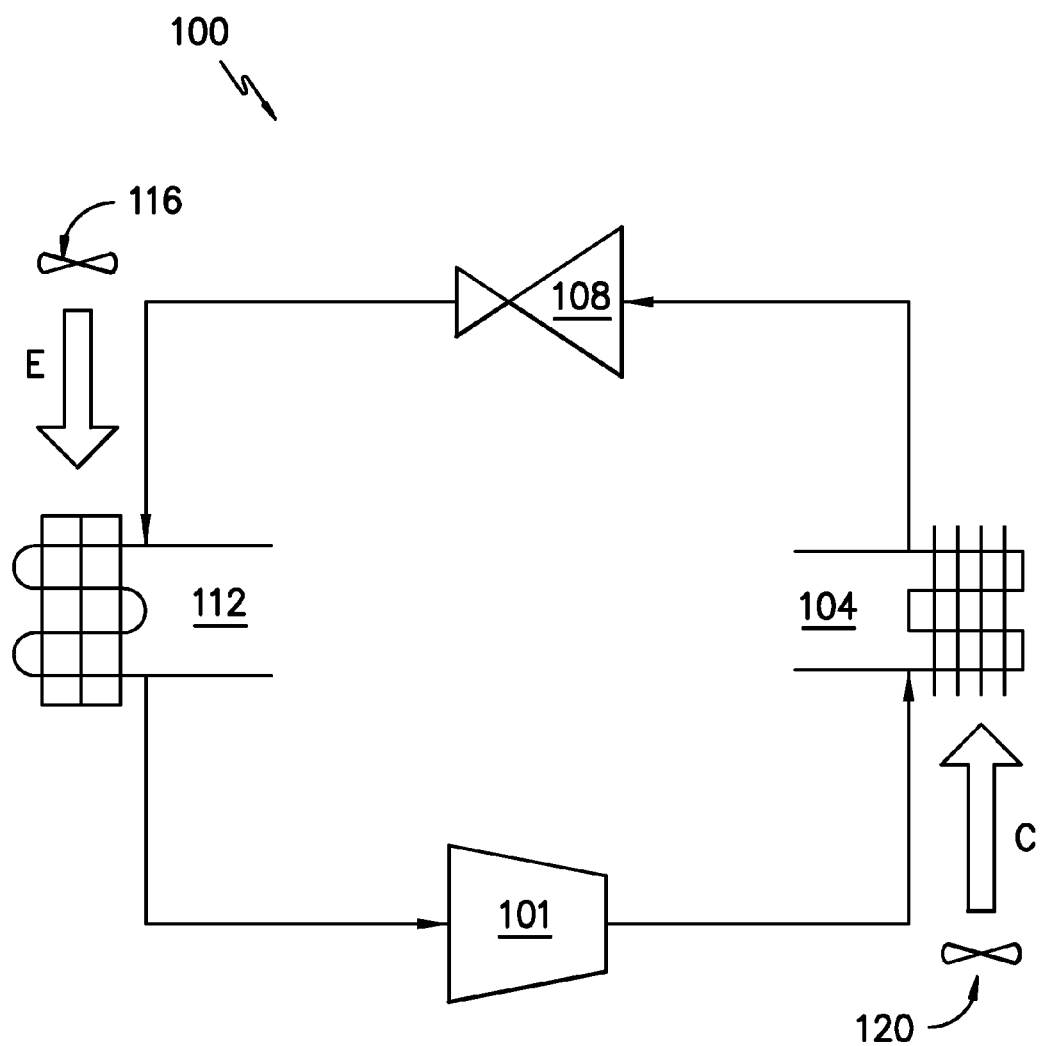
FIG. 2 is a schematic view of an exemplary refrigeration cycle as may be used with the present invention.

Refrigerator 10 includes a machinery compartment that incorporates at least part of the refrigeration cycle 100 shown in FIG. 2. The components of refrigeration cycle 100 include a refrigerant compressor unit 101, a condenser 104, an expansion device 108, and an evaporator 112| all connected in series and charged with a refrigerant. Compressor unit 101 is a variable speed compressor. For example, the speed of compressor unit 101 can be varied between zero and 100 percent by the controller. A compressor with variable speed over other ranges may be used as well. The speed of compressor 101 can be determined by, and communicated to, compressor 101 by the controller.

Evaporator 112 is a type of heat exchanger that transfers heat from air passing over the evaporator 112 to a refrigerant flowing through evaporator 112, thereby causing the refrigerant to vaporize. Evaporator fan 116 is used to force air over evaporator 112 as shown by arrow E. As such, cooled air is produced and configured to refrigerate compartments 12, 14 of refrigerator 10. In one exemplary embodiment of the present invention, fan 116 can be a variable speed evaporator fan—meaning the speed of fan 116 may be controlled or set anywhere between and including, for example, 0 and 100 percent. A fan having variable speed over other ranges may be used as well. The speed may be detected by a sensor and/or dynamically controlled through amperage or voltage. The speed of the evaporator fan 116 can be determined by, and communicated to, evaporator fan 116 by the controller Other control configurations may be used as well including a non-variable speed fan.

From evaporator 112, vaporized refrigerant flows to compressor unit 101, which increases the pressure of the refrigerant. This compression of the refrigerant raises its temperature, which is subsequently lowered by passing the gaseous refrigerant through condenser 104 where heat exchange with ambient air takes place so as to cool the refrigerant. Fan 120 is used to force air over the condenser for cooling the refrigerant as depicted by arrow C. Expansion device 108 (depicted in FIG. 2 as a single valve) is used to further reduce the pressure of refrigerant leaving condenser 104 before being fed as a liquid or liquid-gas mixture to evaporator 112. The refrigeration cycle 100 depicted in FIG. 2 is provided by way of example only. It is within the scope of the present invention for other configurations of the refrigeration system 100 to be used as well.

In the operation of refrigerator 10, typically a set point temperature is selected for one or more components of the refrigeration appliance. These set point temperatures may be selected by the user or may be preset by the manufacturer. As used herein, a component of the appliance may be the refrigeration compartment, the freezer compartment, an ice maker, the evaporator(s), and/or various other elements of a refrigerator appliance and its machinery compartment. A different set point temperature may be used for each such component. Of course, not all components of every appliance may have an independent set point temperature.

Accordingly, as used herein $T_{i\text{-}SP}$ represents the set point temperature that is selected for component i of a refrigeration appliance such as refrigerator 10, where i is an integer greater than or equal to one—depending on the number of components for which a temperature set point is desired. $T_i$ represents a temperature of each such component i, where such temperature can be measured e.g., using one or more temperature sensors in communication with one or more controllers of the appliance. For example, compartment 12 is configured with temperature sensor 52 while compartment 14 is configured with temperature sensor 54.

In an exemplary method of the present invention for operating a refrigerator appliance, enthalpy is used as a control parameter instead of temperature set point. More specifically, excess enthalpy (instead of the difference between temperature set point $T_{i\text{-}SP}$ and measured temperature $T_i$) of one or more components i is used as a control parameter as further described below. Furthermore, for a refrigerator appliance such as that described above, the inventors have determined that a model can be developed based on the enthalpy of air in certain components such as the fresh food storage compartment 12 and freezer storage compartment 14.

Using the refrigerator appliance 10 of FIGS. 1 and 2 by way of example, Equation 1 provides an energy balance that can be written for refrigerator 10:

$$H_n = H_{n-1} - Cap \times \Delta t \qquad \text{Eqn. 1}$$

where $H_n$=total excess enthalpy in the appliance at time n, $H_{n-1}$=total excess enthalpy in the appliance at time n−1, Cap=the rate of heat transfer from air to the evaporator, which is equated with the instantaneous cooling capacity provided by the compressor, and $\Delta t$=time internal between n and n−1.

Equation 1 defines the total excess enthalpy H of the air in the refrigerator appliance 10 at any given time as the total excess enthalpy at the previous time step minus the amount of enthalpy removed from the system between the two measurements.

Excess enthalpy $H_i$ can also be defined as the difference in enthalpy of a refrigerator component i that is at a certain temperature $T_i$ and the same component when at the desired set point $T_{i\text{-}SP}$. For refrigerator appliance 10, the total excess enthalpy H for i components of refrigerator appliance 10 can be defined as the summation of the excess enthalpies $H_i$ of each component.

Accordingly, using air temperature to determine the excess enthalpy, Equation 2 (below) provides the total excess enthalpy H for refrigerator 10 modeled with two components (i=2) where the fresh food storage compartment 12 is represented with subscripts ff and the freezer storage compartment 14 is represented as fz:

$$H = m_{ff}(h_{ff} - h_{ff,sp}) + m_{fz}(h_{fz} - h_{fz,sp}) \qquad \text{Eqn. 2}$$

where $m_{ff}$=mass of air in compartment 12, $h_{ff}$=air specific enthalpy in compartment 12 at the current temperature $T_i$, $h_{ff,sp}$=air specific enthalpy in compartment 12 at the desired temperature $T_{i\text{-}SP}$, $m_{fz}$=mass of air in compartment 14, $h_{fz}$=air specific enthalpy in compartment 14 at the current temperature $T_i$, and $h_{asp}$=air specific enthalpy in compartment 14 at the desired temperature $T_{i\text{-}SP}$.

As stated above, more components i could be used and added to Equation 2.

The mass of air in each compartment can be can be calculated as, $$m = \rho V \qquad \text{Eqn. 3}$$

where

ρ=air density at the measured compartment temperature
V=total volume of the compartment.

In one exemplary control method of the present invention, the air density is calculated based on the measured compartment temperature. This approach can provide more accuracy than using a fixed density value because the density of air in each compartment changes significantly with temperature.

A complete energy balance to calculate excess enthalpy would include other terms such as heat leaks into the system from e.g., opening the doors 42 and 44, leaks through the case 16, and other factors. While these terms are generally unknown, the inventors have determined that a control system can be created that treats such events as disturbances to the system. As such, Equation 1 can be rearranged to the following form.

$$\frac{H_n - H_{n-1}}{\Delta t} = -\text{Cap} \Rightarrow \frac{\partial H}{\partial t} = -\text{Cap} \qquad \text{Eqn. 4}$$

Accordingly, Equation 4 gives a method of calculating the rate of heat transfer from air to the evaporator 112, which is equal to the instantaneous cooling capacity that must be provided by compressor 101 or Cap. A more suitable form of the equation can be obtained by taking the Laplace transform of Equation 4, to provide the following Equation 5:

$$\frac{H}{\text{Cap}} = \frac{-1}{s} \qquad \text{Eqn. 5}$$

Equation 5 provides the transfer function for the refrigerator 10 as modeled earlier using Equation 2. The inventors have determined that a goal of the control system is to reduce the excess enthalpy of each component of the system, $H_i$, to zero or substantially to some predetermined minimal value $H_{PMV}$. Stated alternatively, a goal of the control system is to reduce the total excess enthalpy H of refrigerator appliance 10 to zero. Applying this goal, a controller can be designed to determine the instantaneous required cooling capacity Cap that must be provided by compressor 101.

By way of example, a proportional integral controller (i.e. PI controller) using an integrator can accommodate for disturbances in the modeled system as discussed above as well as differences in the specific heat of various food items placed in refrigerator 10. A schematic example of such a controller 220 is shown in the block diagram of FIG. 3.

Figure 3:
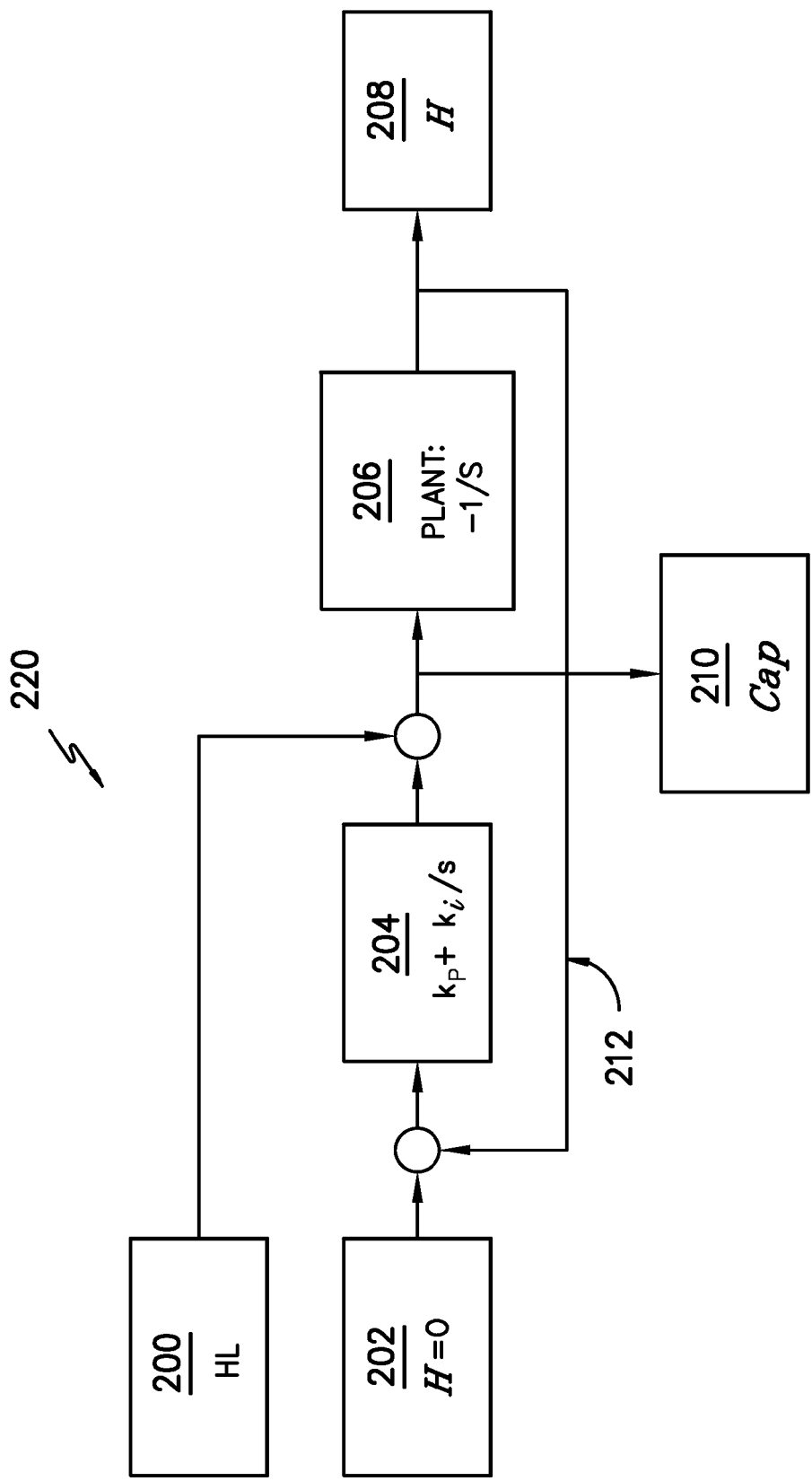
FIG. 3 is a schematic diagram of a controller of the present invention.

The set point 202 for controller 220 is for the excess enthalpy $H_i$ for one or more components i of the refrigeration system to be substantially zero. Where multiple components are involved (such as e.g., fresh food storage compartment 12 and freezer storage compartment 14), the total excess enthalpy H for all i components can be set to zero as indicated in FIG. 3. In alternative embodiments of the invention, the point 202 for controller 220 could be for excess enthalpy $H_i$ of a component or the total excess enthalpy $H_i$ of the appliance to be substantially at a predetermined minimum value $H_{PMV}$.

The output 210 of the controller is Cap, which is the instantaneous cooling capacity required of compressor 101. During operation of appliance 10, the set point temperature $T_{i\text{-}SP}$ for one or more components i is received by the controller 220 as well as the measured temperature $T_i$ for one or more components i. Illustrated as block 208 in FIG. 3, controller 220 then calculates the excess enthalpy $H_i$ for component i or the total excess enthalpy H for multiple components i, which provides the feedback signal 212. For this exemplary embodiment, HL in block 200 represents the heat leak into the system and can be inserted into controller 220 as a feed-forward term. While inputting HL can hasten the stabilization of the control system, HL is not a required term and can be dispensed with in other embodiments of the invention. HL can be a predetermined number, or a dynamic value determined based on the status and usage pattern of the system as identified by various sensors (temperature sensors, door sensors, etc).

Plant model 206 as introduced in Equation 5 above is a linear system and can be tuned analytically. The inventors have determined that this feature of control system 220 provides a substantial advantage over non-linear systems because minimal or no experimentation is required for tuning and such tuning can be applied to various models and platforms for a refrigerator appliance—not just the configuration shown in FIGS. 1 and 2. In contrast, non-linear systems can require significant design time and tuning parameter may vary significantly between models and platforms.

To tune the first order system represented by Equation 5 and FIG. 3, a value for a predetermined settling time $t_s$ is selected, which represents the amount of time in which one or more components i should each reach their respective desired set point temperatures $T_{i\text{-}SP}$. In another exemplary embodiment of the invention, settling time $t_s$ represents the amount of time in which one or more components i should each vary by no more than about 2 percent from their respective desired set point temperatures $T_{i\text{-}SP}$. Other percentages may be used as well.

For example, in one exemplary embodiment of the invention, settling time period $t_s$ is in the range of about 0.5 hours to about 2 hours. In another exemplary embodiment, $t_s$ is in the range of about 1 hours to about 2 hours. In still another exemplary embodiment, $t_s$ is about 1.5 hours.

Additionally, a predetermined value for a damping ratio ζ is selected. In one exemplary embodiment of the invention, damping ratio ζ is in the range of about 0.7 to 1.5. In still another exemplary embodiment of the invention, damping ratio ζ is about 1.

After receiving the predetermined values for damping ratio ζ and $t_s$, the proportional constant $k_p$ and integral constant $k_i$ in block 204 of FIG. 3 can be calculated by controller 220 using the following equations:

$$\omega_n = \frac{4}{\zeta t_s} \qquad \text{Eqn. 6}$$

where $\omega_n$ is a natural frequency,
ζ is a damping ratio, and
$t_s$ is the predetermined settling time.

$$k_p = 2\zeta\omega_n \qquad \text{Eqn. 7}$$

$$k_i = k_p^2 + 2(1-\zeta)^2\omega_n^2 \qquad \text{Eqn. 8}$$

By way of example, a settling time $t_s$ of 1.5 hrs (5400 s) for a critically damped system results in $k_p \approx 0.0015$ and $k_i \approx 2.25\text{e-}6$.

Once the required cooling capacity Cap is calculated, the controller can convert this into a signal—such as a PWM signal—that can be transmitted to the variable speed compressor 101. For every compressor, power and capacity are unique functions of evaporating temperature ($T_{ev}$), condensing temperature ($T_{cond}$), and compressor speed ($S_c$). Modern variable speed compressors can be provided with compressor charts that include multiple combinations of these parameters and their corresponding power consumption (Pow) and cooling capacity (Cap) values. Regressions can be used to determine the power and capacity functions.

With knowledge of $T_{ev}$, $T_{cond}$, $S_c$, and their corresponding values for Pow and Cap, relations can be developed in forms of Pow=P ($T_{ev}$, $T_{cond}$, $S_c$) and Cap=C ($T_{ev}$, $T_{cond}$, $S_c$). As will be understood by one of skill in the art using the teachings disclosed herein, the most efficient compressor operating speed to provide the required cooling capacity can then be determined by solving the following equation:

$$\text{Minimize } P(T_{ev}, T_{cond}, S_c) \text{ with the constraint function}$$

$$C(T_{ev}, T_{cond}, S_c) \geq Cap, T_{amb} \leq T_{cond}, \text{ and}$$

$$S_{c\,min} \leq S_c \leq S_{c\,max} \qquad \text{Eqn. 9}$$

where $T_{amb}$ is the ambient temperature

Equation 9 is a non-linear constrained optimization problem to minimize power P while the delivered capacity is greater than the minimum required Cap, compressor speed $S_c$ is between the minimum $S_{c\,min}$ and maximum $S_{c\,max}$ allowable limits, and condensing temperature is constrained to be greater than the ambient temperature ($T_{amb}$) so as to exclude unrealistic solutions. The solution to the Equation 9 can be obtained in various ways including, for example, Sequential Linear Programming (SLP).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance comprising a variable speed compressor, the steps comprising:
   receiving a set point temperature $T_{i\text{-}sp}$ for a component of the appliance;
   measuring the temperature $T_i$ of the component;
   calculating an excess enthalpy $H_i$ of the component from the steps of receiving and measuring;
   determining an instantaneous cooling capacity required $C_{ap}$ to reduce the excess enthalpy $H_i$ to zero within a selected time period $T_s$; and
   calculating a compressor speed that delivers at least the instantaneous cooling capacity required $C_{ap}$ while minimizing power consumption of the compressor;
   operating the variable speed compressor at the determined compressor speed.

2. A method of operating a refrigerator appliance as in claim 1, wherein:
   the step of receiving further comprises receiving the set point temperatures $T_{i\text{-}SP}$ for multiple components of the appliance;
   the step of measuring further comprises measuring the temperatures $T_i$ for multiple components of the appliance;
   the step of calculating an excess enthalpy $H_i$ further comprises calculating the excess enthalpy $H_i$ for each of the multiple components of the appliance; and wherein the method of operating a refrigerator appliance further comprises
   calculating the total excess enthalpy H of the appliance from the excess enthalpy $H_i$ determined for the multiple components of the appliance.

3. A method of operating a refrigerator appliance as in claim 1, wherein the multiple components of the appliance comprise a fresh food compartment and a freezer compartment.

4. A method of operating a refrigerator appliance as in claim 3, wherein the excess enthalpies $H_i$ for the freezer compartment and fresh food compartment are calculated based on a mass of air in the freezer compartment and a mass of air in the fresh food compartment.

5. A method of operating a refrigerator appliance as in claim 1, wherein the step of calculating a compressor speed further comprises applying a regression analysis of the compressor cooling capacity to calculate the compressor speed.

6. A method of operating a refrigerator appliance as in claim 1, wherein the step of determining comprises using a proportional-integral controller that is based on a linear model of the refrigerator appliance.

7. A method of operating a refrigerator appliance as in claim 6, wherein the step of determining further comprises:
   receiving a desired settling time; and
   using a proportional-integral controller that calculates a proportional constant $k_p$ and an integral constant $k_i$ using the following relationship:

$$\omega_n = \frac{4}{\zeta t_s}$$

where
   $\omega_n$ is a natural frequency,
   $\zeta$ is a damping ratio, and
   $t_s$ is the desired settling time.

8. A method of operating a refrigerator appliance as in claim 7, wherein the step of determining further comprises using the proportional-integral controller in which the proportional constant $k_p$ is determined using the following relationship:

$$k_p = 2\zeta\omega_n$$

9. A method of operating a refrigerator appliance as in claim 8, wherein the step of determining further comprises using the proportional integral controller in which the integral constant $k_i$ is determined using the following relationship:

$$k_i = k_p^2 + 2(1-\zeta)^2 \omega_n^2$$

10. A method of operating a refrigerator appliance as in claim 9, wherein the desired settling time $t_s$ is in the range of about 0.5 hours to about 2 hours.

11. A method of operating a refrigerator appliance as in claim 7, wherein the desired settling time $t_s$ is in the range of about 1 hour to about 2 hours.

12. A method of operating a refrigerator appliance as in claim 1, further comprising the step of setting the speed of the compressor based on results from the step of calculating a compressor speed.

13. A refrigerator appliance, comprising:
at least one component that is configured for cooling during operation of the appliance;
a refrigeration loop configured for providing cooling to the component during operation of the appliance, the refrigeration loop comprising
one or more evaporators;
one or more condensers;
a variable speed compressor;
one or more expansion devices;
at least one temperature sensor configured for providing temperature measurement of the component;
one or more controllers configured for
receiving at least one temperature measurement from the temperature sensor;
calculating an excess enthalpy of the component using the at least one temperature measurement and a temperature set point;
determining an instantaneous cooling capacity required Cap to reduce the excess enthalpy to a predetermined minimum value $H_{PMV}$ within a predetermined time period $t_s$; and
ascertaining a compressor speed $S_c$ that delivers at least the instantaneous cooling capacity required Cap while reducing the power consumption of the compressor,
operating the variable speed compressor substantially at compressor speed $S_c$.

14. A refrigerator appliance as in claim 13, wherein predetermined value $H_{PMV}$ is zero.

15. A refrigerator appliance as in claim 13, wherein said at least one component comprises a compartment of the appliance, and wherein the excess enthalpy for the compartment is calculated based on a mass of air in the compartment.

16. A refrigerator appliance as in claim 13, wherein said one or more controllers are further configured to apply a regression analysis of cooling capacity of the compressor in ascertaining the compressor speed.

17. A refrigerator appliance as in claim 13, wherein said one or more controllers comprise a proportional-integral controller that is configured with a linear model of the refrigerator appliance.

18. A refrigerator appliance as in claim 17, wherein the proportional integral controller is further configured to apply a proportional constant $k_p$ and an integral constant $k_i$ that are determined using the following relationship:

$$\omega_n = \frac{4}{\zeta t_s}$$

where
$\omega_n$ is a natural frequency,
$\zeta$ is a damping ratio, and
$t_s$ is the predetermined time period.

19. A refrigerator appliance as in claim 18, wherein the proportional constant $k_p$ is determined using the following relationship:

$$k_p = 2\zeta\omega_n$$

20. A refrigerator appliance as in claim 19, wherein the integral constant $k_i$ is determined using the following relationship:

$$k_i = k_p^2 + 2(1-\zeta)^2 \omega_n^2.$$

* * * * *